United States Patent [19]
Peterson

[11] Patent Number: 6,088,104
[45] Date of Patent: Jul. 11, 2000

[54] SURFACE CHARACTERIZATION APPARATUS

[75] Inventor: Lauren M. Peterson, Ann Arbor, Mich.

[73] Assignee: Veridian ERIM International, Inc., Ann Arbor, Mich.

[21] Appl. No.: 08/348,447

[22] Filed: Dec. 2, 1994

[51] Int. Cl.$^7$ .................................................. G01B 11/30
[52] U.S. Cl. ........................................ 356/371; 356/446
[58] Field of Search ................................... 356/371, 237, 356/239, 240, 445–448, 429–430; 250/571, 572, 562, 563

[56] References Cited

U.S. PATENT DOCUMENTS

| | | | |
|---|---|---|---|
| 3,857,637 | 12/1974 | Obenreder | 356/371 |
| 4,072,426 | 2/1978 | Horn | 356/446 |
| 4,296,333 | 10/1981 | Milana et al. | 356/446 |
| 4,613,235 | 9/1986 | Suga | 356/446 |
| 4,945,253 | 7/1990 | Frohardt | 356/446 |
| 5,179,425 | 1/1993 | Reinsch et al. | 356/371 |
| 5,249,029 | 9/1993 | Sommer et al. | 356/336 |
| 5,298,974 | 3/1994 | Chandley | 356/371 |

*Primary Examiner*—Hoa Q. Pham
*Attorney, Agent, or Firm*—Gifford, Krass, Groh, Sprinkle, Anderson & Citkowski, PC

[57] ABSTRACT

A hand-held instrument provides a simple and elegant approach to determining the presence or absence of a surface condition such as roughening. A light source such as a laser diode illuminates a localized area of the surface to be characterized, and a light-sensitive detector is supported to receive light reflected by the surface and generate an electrical signal representative of the light received. An optical blocking element is placed at a first point along the axis of the reflected light, and a focussing lens is placed at a second point along the axis. If the surface is smooth or not sufficiently roughened, light is reflected substantially along the axis and blocked by the element so it does not reach the detector. If the surface is roughened, however, the reflected light is scattered off-axis and focussed by the lens onto the detector, thereby effectively bypassing the blocking element. Electrical circuitry is connected to receive the output of the detector and activate an indicator to which an operator may refer.

5 Claims, 2 Drawing Sheets

SURFACE CHARACTERIZATION APPARATUS

FIELD OF THE INVENTION

The present invention relates generally to optical surface characterization and, in particular, to a portable device which provides an indication concerning the presence or absence of surface condition.

BACKGROUND OF THE INVENTION

There are a considerable number of known techniques associated with surface characterization. For example, U.S. Pat. Nos. 3,804,534 and 4,918,321 teach methods and apparatus directed toward such characterization. These prior art systems, however, tend to be highly sophisticated, typically including means whereby very detailed characteristics associated with a wide range of surface types may be analyzed and displayed, often resulting in an expensive end product.

However, there are certain applications where a fast but accurate true/false type of determination is required instead of such a detailed analysis. One such application is associated with the processes involved with the bonding to glass surfaces. For example, prior to the bonding of mechanical fasteners to automobile window glass, the region of glass to be bonded is necessarily microscopically roughened, with an etchant such as silene forming a thin primer coating. This primer coating etches the glass so that the bonding attaches securely to the glass and remains intact even under the stresses of daily window use. If the primer is not applied correctly such mechanical clips may appear to be bonded properly, but will be lacking in strength, resulting in premature failure.

As such, prior to the process of bonding these mechanical components to the glass surface, it is desirable to have a fast and accurate test of surface roughness to ensure that the primer has been applied sufficiently and in the correct locations, whether on one or both sides of the glass panel. Such an application is not served by an expensive and complex piece of analytical equipment. Since the characteristics of the glass surface before and after the application of the etchant are well known, it should be unnecessary to perform a detailed analysis, and it is certainly unnecessary to provide an image of the surface. All that the individual testing the surface requires is a fast but accurate indication of whether the surface in a region of interest has been prepared to a predetermined extent, or whether it remains smooth and untreated.

SUMMARY OF THE INVENTION

The present invention provides a simple and elegant approach to the characterization of surface defects, abrasion, etching, pits, scratches or a rough surface coating or transparent paint. The apparatus is economical, and the method used is fast but accurate. The apparatus includes a light source which is used to illuminate a localized area of the surface to be characterized, and a light-sensitive detector supported to receive light reflected by the surface and generate an electrical signal representative of the light received. A line extending from the surface to the detector defines an optical axis associated with the reflected light. An optical blocking element is placed at a first point along this axis, and a focusing lens is placed at a second point along the axis.

If the surface is sufficiently smooth, light is reflected substantially along the axis and blocked by the element so it does not reach the detector. If the surface is roughened or not substantially smooth, however, the reflected light is scattered off-axis and imaged by the lens onto the detector, thereby effectively bypassing the blocking element. Electrical circuitry is connected to receive the output of the detector and activate an indicator to which an operator may refer.

In the preferred embodiment all components are contained within a hand-held enclosure including a window intended for placement adjacent the surface to be characterized. The light source, preferably in the form of a diode laser, is disposed within the enclosure to project a beam of light through the window and onto a localized area of the surface. The light-sensitive detector is supported within the enclosure to receive light through the window, with the localized area of the surface and the position of the detector being optically conjugate to maximize signal strength. The electrical circuitry preferably includes an amplifier connected to receive the output of the detector and provide a gain-adjusted signal. A comparator is operative to compare an adjustable threshold signal to the gain-adjusted output of the detector and deliver a signal to the indicator if the gain-adjusted signal exceeds the threshold signal, thus indicating that the surface roughening is greater than a predetermined value.

The method therefore comprises the steps of:
- illuminating a localized area of a surface with beam of light;
- disposing a light-sensitive detector in the path of the light reflected by the surface, the line extending from the surface to the detector defining an optical axis;
- blocking light reflected along the optical axis from reaching the detector;
- imaging light scattered off-axis onto the light-sensitive detector; and
- indicating whether an amount of light above a predetermined threshold has been reflected by the surface and focused onto the detector.

DETAILED DESCRIPTION OF THE PREFERRED EMBODIMENTS

The present invention provides a portable surface characterization apparatus but, unlike prior-art devices, the apparatus may be readily adjusted for a fast, accurate indication of the presence or absence of a single surface characteristic, such as defects, thin-film coatings or roughness, to a predetermined degree. The description which follows concerns the use of the invention in determining whether an area of a glass panel has been properly prepared, but it should be understood that the invention is equally applicable to any surface testing application wherein such a presence/absence indication of a single surface characteristic or combination of characteristics is desired.

Figure 1:
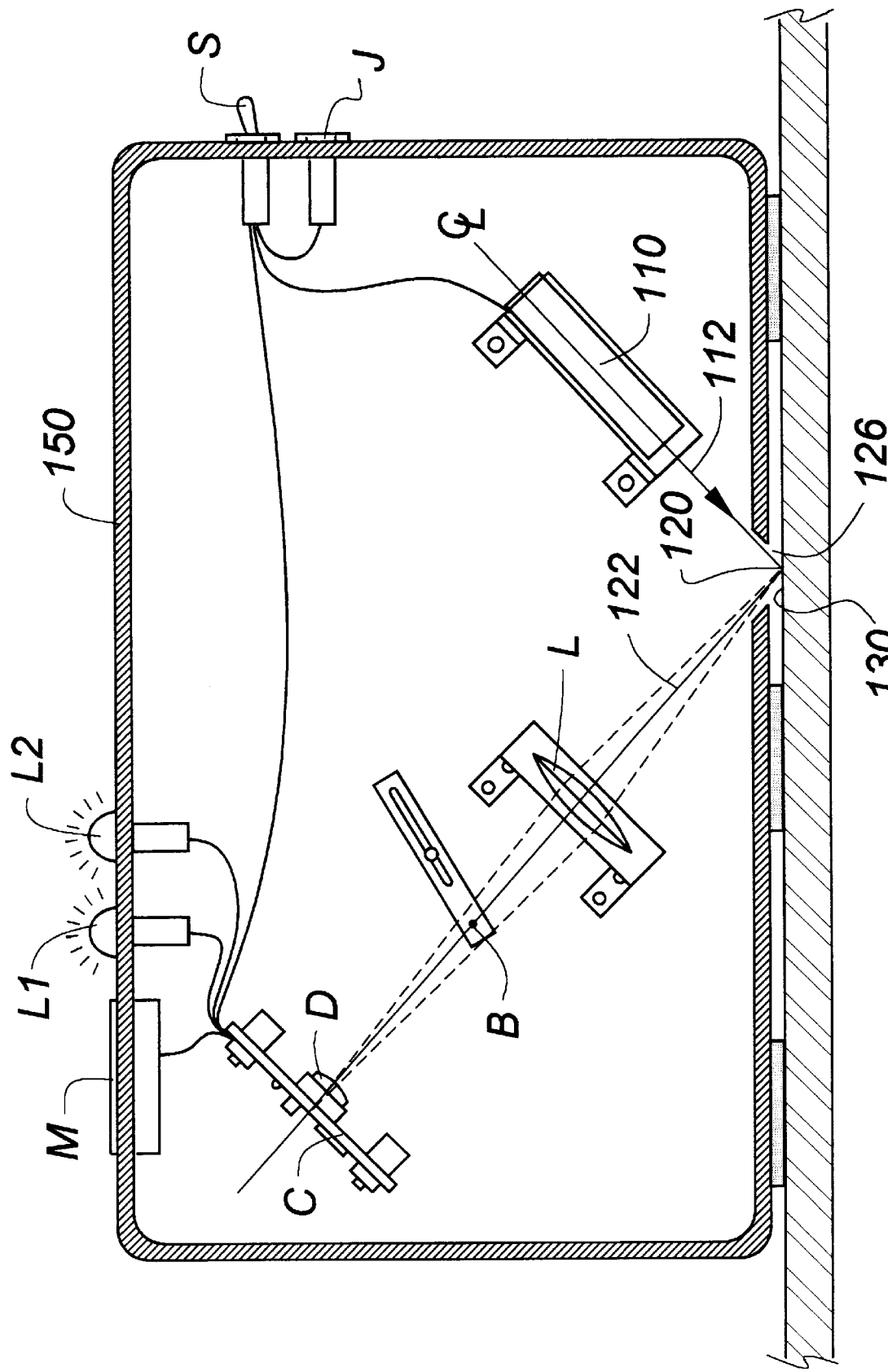
FIG. 1 is a simplified side view drawing of an apparatus formed according to this invention which shows optical paths and related components.

FIG. 1 illustrates a side view cross section of a portable inspection device formed according to this invention. Broadly, a light source 110, preferably a semiconductor diode laser, directs optical energy along path 112 which impinges upon the surface of the panel under inspection at point 120. Although in the preferred embodiment source 110 is a laser, other types of sources, including non-coherent sources, may be utilized. From here, the beam is reflected along a second path 122 and focused by lens L onto a detector D. The detector D is mounted to a printed circuit board C containing the electronics which will be described with reference to FIG. 2, these electronics being in operative communication with connector jack J, switch S, indicator lamps L1 and L2, and optional meter M.

DC power is supplied through jack J and controlled using switch S. The laser diode is powered with 5 volts DC, whereas ±12 volts is used to power the remaining electronics. With the power switched on, lamp L1, preferably a red light emitting diode, is turned on. The collimated laser light, preferably comprising a 670 nm red beam 112, is directed to an opening 126 in the enclosure 150, where it is reflected from the surface under inspection 130 and subsequently focused by lens L.

If the glass is clean, smooth and free of defects, the reflected light remains collimated and is focused to a small spot at the blocker B, one focal length from the lens. If the beam remains collimated, it strikes the blocking device and little or no light is capable of reaching the detector D. If, on the other hand, the glass surface has been coated with an etching primer or treated in any manner capable of producing a sufficiently pronounced surface roughening, some of the laser light will be scattered in various directions about the axis 122 of the reflected light. Lens L is now able to gather this light and focus it onto the detector D. Since the scattered light originates at the surface of the glass, the lens will effectively create an image in the conjugate image plane at the location of the detector. Since most of this focused, scattered light avoids the blocking element B by following paths other than the central axis, a relatively strong signal reaches the detector, which may then be used to indicate that the surface has been roughened.

It should be noted that this embodiment of the invention is designed to be sensitive only to roughening on the surface adjacent the window of the unit. If laser light passes through the glass and is reflected by the far surface, that light will be displaced and blocked by the window of the enclosure. As such, the light reflected or scattered by the far surface will not enter the window and cannot reach the detector.

Figure 2:
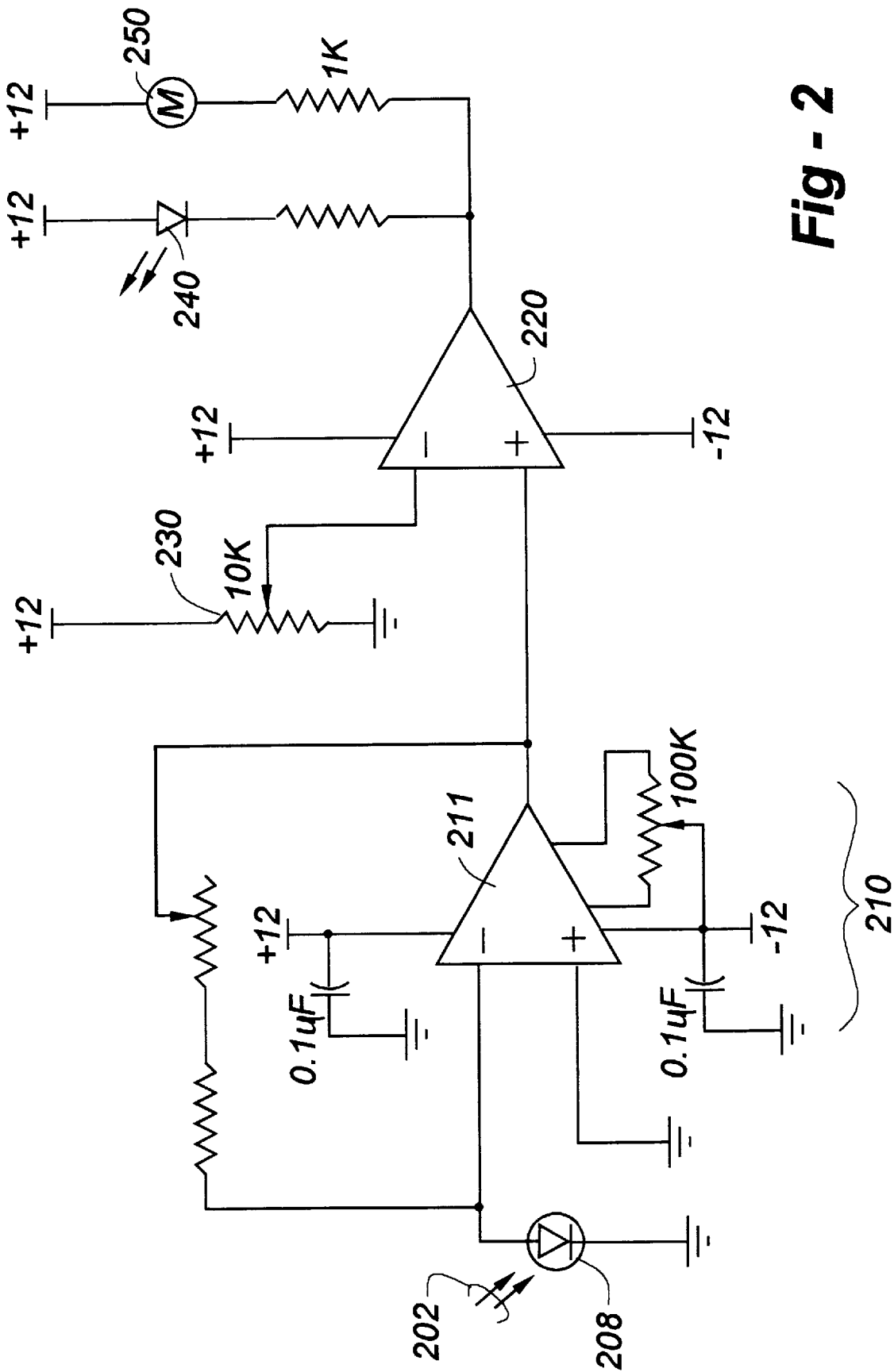
FIG. 2 is a schematic diagram of the apparatus detection and comparator electronics.

FIG. 2 is a schematic diagram used to illustrate a preferred configuration of the electronics associated with the present invention. Reflective light 202 impinges upon the detector 208. The signal developed by the detector 208 is amplified by a first stage 210 including an amplifier preferably in the form of an operational amplifier 211 and including a gain adjustment potentiometer 212 in the feedback path from the output of the amplifier to its inverting input. The gain-adjusted output of the amplification stage 210 is then delivered to a comparator 220 preferably in the form of another op amp, which compares the amplified signal from the detector to a threshold voltage, this threshold being adjustable through the use of another potentiometer 230. If the gain adjusted a output from the amplification stage 210 exceeds the threshold voltage, the output of the comparator 220 then drives the indicator, preferably in the form of a second light-emitting diode (LED) 240 (L1 or L2 in FIG. 1). The output of the comparator also produces a deflection on optional meter 250. If no reflective light impinges upon the detector 208, no signal is developed and neither the LED 240 nor the optional meter 250 is activated.

In operation, as the enclosure containing the electronics slides over the surface of a glass window under inspection, the LED 240 will remain off until the edge of the area roughened through the primer coating has been reached. At this point the LED will become illuminated, and will remain on until the unit moves past the outer edge of the rough surface and on to clean smooth glass, at which point the LED 240 will turn off.

Having thus described my invention, I claim:

1. A portable device for determining the presence or absence of surface roughening, comprising:

a hand-held enclosure including a window to be placed adjacent an moved along a surface to be characterized;

a light source disposed within the enclosure to project a beam of light through the window and onto a localized area of the surface, the path of the beam reflected by the surface and back through the window defining an optical axis;

a light-sensitive detector disposed on the optical axis within the enclosure to receive light scattered by the surface and output an electrical signal representative of the light received;

an optical blocking element supported within the enclosure at a point along the optical axis between the window and the detector to block the beam when reflected by a substantially non-roughened surface;

a lens supported within the enclosure along the optical axis at a point between the window and the blocking element to gather light scattered off-axis by a roughened surface and focus the gathered light onto the detector;

a two-state indicator disposed on the enclosure; and electrical circuitry disposed within the enclosure, including a source of an adjustable threshold signal and a comparator operative to compare the threshold signal to the output of the detector and deliver a signal to change the state of the indicator if the output of the detector exceeds the threshold signal.

2. The portable device of claim 1, including a diode laser as a light source.

3. The portable device of claim 1, the localized area of the surface and the detector position being optically conjugate with respect to the surface being inspected.

4. The portable device of claim 1, the surface being a glass surface.

5. The portable device of claim 4, the glass surface being roughened for adhesive bonding purposes.

* * * * *